United States Patent
Maenner et al.

(10) Patent No.: US 7,475,567 B2
(45) Date of Patent: Jan. 13, 2009

(54) METHOD AND APPARATUS FOR CONTINUOUSLY MANUFACTURING CALIBRATED ROUND OR PROFILED GLASS TUBES

(75) Inventors: Thomas Maenner, Mitterteich (DE); Michael Ziegler, Friedenfels (DE); Franz Ott, Konnersreuth (DE); Gerd Rosner, Konnersreuth (DE)

(73) Assignee: Schott AG, Mainz (DE)

( * ) Notice: Subject to any disclaimer, the term of this patent is extended or adjusted under 35 U.S.C. 154(b) by 421 days.

(21) Appl. No.: 11/098,142

(22) Filed: Apr. 4, 2005

(65) Prior Publication Data

US 2005/0227027 A1    Oct. 13, 2005

(30) Foreign Application Priority Data

Apr. 8, 2004 (DE) ........................ 10 2004 018 148

(51) Int. Cl.
   *C03B 15/14*  (2006.01)
   *C03B 5/26*   (2006.01)
   *C03B 7/00*   (2006.01)

(52) U.S. Cl. .............................. 65/86; 65/187; 65/126; 65/129; 65/330; 65/87

(58) Field of Classification Search ............... 65/86–87, 65/187, 126, 129, 330, 331; 428/34.4
   See application file for complete search history.

(56) References Cited

U.S. PATENT DOCUMENTS

| | | | | |
|---|---|---|---|---|
| 2,009,793 A | | 7/1935 | Sanchez-Vello | |
| 2,765,586 A | * | 10/1956 | Wilson | 65/187 |
| 3,035,371 A | * | 5/1962 | Zangari et al. | 65/161 |
| 3,230,060 A | * | 1/1966 | Lippmann | 65/32.5 |
| 3,269,821 A | * | 8/1966 | Vatterodt | 65/187 |
| 3,298,808 A | * | 1/1967 | Macks | 65/25.1 |
| 3,410,675 A | * | 11/1968 | Dockerty | 65/129 |
| 3,607,184 A | * | 9/1971 | Williams | 65/83 |
| 4,228,206 A | * | 10/1980 | Fabisak | 428/34.6 |
| 4,247,320 A | * | 1/1981 | Bansal et al. | 65/134.7 |
| 4,717,607 A | * | 1/1988 | Pfizenmaier et al. | 428/34.6 |
| 4,941,904 A | * | 7/1990 | Barch et al. | 65/494 |
| 5,080,705 A | * | 1/1992 | Ott et al. | 65/87 |
| 2001/0055930 A1 | * | 12/2001 | Ott et al. | 445/9 |
| 2004/0118164 A1 | * | 6/2004 | Boek et al. | 65/398 |
| 2005/0092030 A1 | * | 5/2005 | Balakrishnan et al. | 65/421 |
| 2005/0227027 A1 | * | 10/2005 | Maenner et al. | 428/34.4 |
| 2006/0260360 A1 | * | 11/2006 | Dick et al. | 65/60.53 |

FOREIGN PATENT DOCUMENTS

| | | |
|---|---|---|
| DE | 497 649 | 5/1930 |
| DE | 2 217 725 | 8/1974 |
| DE | 254380 | 2/1988 |
| SU | 715511 A | 2/1980 |
| SU | 837943 A | 6/1981 |

* cited by examiner

*Primary Examiner*—Steven P Griffin
*Assistant Examiner*—Jodi Cohen
(74) *Attorney, Agent, or Firm*—Michael J. Striker (57) ABSTRACT

In the method molten glass emerges from an outlet opening of a melt feed. The molten glass is drawn over a shaping body so as to form a hollow drawing bulb. According to the invention, the drawing bulb is drawn over a profile forming body positioned downstream of the shaping body so that inner circumferential surfaces of the drawing bulb are deformed while abutting against outer surfaces of the profile forming body to form the predetermined inner profile. The distance between the shaping body and the profile forming body can be changed to vary the wall thickness of the glass tube.

10 Claims, 8 Drawing Sheets

METHOD AND APPARATUS FOR CONTINUOUSLY MANUFACTURING CALIBRATED ROUND OR PROFILED GLASS TUBES

CROSS-REFERENCE

The invention described and claimed herein below is also described in DE 10 2004 018 148.9 filed on Apr. 8, 2004 in Germany. The foregoing German Patent Application provides the basis for a claim of priority under 35 U.S.C. 119 (a) to (d).

BACKGROUND OF THE INVENTION

The present invention relates to a method and apparatus for continuously manufacturing calibrated round or profiled glass tubes, especially calibrated round or profiled glass tubes having a pre-determined inner profile and/or a pre-determined outer profile.

Glass tubes of the aforesaid type, having lengths of up to several metres are required as starting material for manufacturing a wide range of glass elements, for example, for manufacturing bottles and containers, tubular covers for illuminants and for manufacturing illuminant tubes in lighting engineering. On the one hand, it is required that these glass tubes should be produced as cheaply as possible. On the other hand, in many applications, for example in lighting engineering, there is a demand for glass tubes having precisely finished inner profiles, for example, predetermined by the technical specifications in the respective application.

In the manufacture of glass tubes, a fundamental distinction is made between discontinuous and continuous manufacturing methods. Because of the fundamentally different process parameters in most cases, the principles applied in discontinuous manufacturing methods cannot or at least cannot easily be transferred to continuous manufacturing methods so that they cannot serve as a stimulus for the person skilled in the art to improve continuous manufacturing methods.

DE 497 649 discloses a method and apparatus for drawing glass tubes having round or non-round inner profiles using the so-called Danner method. In this method liquid glass is externally guided onto an inclined, rotating tubular body and drawn off as a tube at its lower end. In this method the inner profile of the drawn glass tube is defined by the outer profile of the tubular body at its lower end. In order to produce glass tubes have a non-round inner profile, the lower end of the tubular body can also have an outer contour which deviates from a circular shape. The inner profile of the glass tubes thus produced has comparatively high tolerances. The edge radii of glass tubes having non-round profiles are also comparatively large. Thus, this method frequently no longer meets the present requirements for the precision and tolerances of calibrated round or profiled glass tubes.

U.S. Pat. No. 2,009,793 discloses the so-called Vello method for continuously manufacturing glass tubes having a circular inner profile. A substantially cone-shaped shaping body is arranged underneath an outlet opening of a melt channel, which serves as a receptacle for the molten glass, concentrically to the outlet member of the melt channel. The emerging molten glass is drawn out by a drawing device through the annular gap between the shaping member and the outlet member so that a glass tube having a circular inner profile substantially predetermined by the outer contour of the shaping body is formed. Downstream from the shaping member the still deformable, tubular glass body is further stretched by means of a drawing device until this has finally cooled below the softening point. The inside diameter and the wall thickness of the glass tube is determined by the dimensions of the annular gap between the shaping member and the outlet member of the melt channel, by the temperature of the emerging molten glass, the temperature relationships downstream of the outlet opening and by the tensile force or drawing speed of the drawing device. It is comparatively difficult to find suitable ranges of parameters for manufacturing glass tubes having different profiles and requires a great deal of experience which at least makes it expensive to completely automate the method. Re-equipping the melting furnace to manufacture glass tubes having different profiles is comparatively expensive. Nevertheless, glass tubes manufactured by the Vello method have tolerances which increasingly are no longer suitable for the present applications.

DE-OS 2 217 725 discloses a method for the continuous manufacture of a quartz tube. A shaping device having a core which determines the inner profile of the glass tube is located at the lower end of a continuously charged melting furnace in the area of the outlet opening. Profiled glass tubes having non-circular inner profiles can also be manufactured by exchanging the core. Re-equipping the melting furnace first requires this to be completely emptied before the core can be exchanged. This is comparatively expensive. The tolerances which can be achieved using this method frequently no longer meet the present requirements. Since very high temperatures are required to melt quartz glass, the process parameters and basic principles disclosed in DE-OS 2 217 725 differ very considerably from the process parameters and basic principles sought in the sense of this application. The principles disclosed in DE-OS 2 217 725 thus cannot be transferred to the subject matter of this application.

DD 254 380 A1 discloses a method and apparatus for continuously manufacturing internally calibrated glass tubes. Molten glass is drawn off from a drawing dish against the force of gravity. In this case, a drawing bulb is formed, which is drawn off at a vertically projecting drawing mandrel in a continuously tapering fashion. The drawing mandrel is used as a shaping body to define the inner profile of the glass tube to be manufactured. A still-deformable tubular body is formed which is drawn through a system of nozzles in which the glass tube sliding over the drawing mandrel is calibrated thereon by applying an underpressure. This process is supported by blowing pre-heated air onto the outside of the glass tube sliding over the drawing mandrel. In order that a glass tube having a constant wall thickness can be produced, the drawing bulb and the drawing mandrel must be rotated synchronously, which is expensive. Furthermore, it is comparatively expensive to control the parameters of the device so that the still-deformable glass tube can be suitably deformed by the nozzle system. Pre-coolers, after-coolers and heating devices need to be used for this purpose. This apparatus is only suitable for manufacturing calibrated round glass tubes and conversion to other inside or outside diameters is comparatively expensive.

SU 715511 and WPI-Abstract thereof disclose a method and an apparatus for manufacturing a calibrated quartz glass tube. The molten glass is drawn via a shaping body by means of a gripper. On the bottom of the shaping body and downstream in drawing direction are disposed a plurality of rods. The molten glass is drawn via these rods, whereby the inner profile of the glass tube is defined. Thus, glass tubes with a rectangular-shaped cross section can be manufactured.

The rods are, however, rigidly connected with the shaping body. In particular, the distance to the shaping body can not be varied. Thus, the method is only suited for a relatively narrow range of working temperatures and drawing velocities.

SU 837943 A and WPI-Abstract thereof disclose another method and apparatus for manufacturing a calibrated quartz glass tube, wherein the molten glass is drawn via a longitudinal profile forming boding disposed downstream of the shaping body. Rollers press the glass tube against the profile shaping body. However, the position of the profile shaping body relative to the shaping body cannot be varied. The parameters of the drawing method therefore can not be varied sufficiently. The glass tube is forcibly formed by means of only two rollers that are disposed opposite to each other.

SUMMARY OF INVENTION

It is an object of the present invention to provide a method and a apparatus for continuously manufacturing calibrated glass tubes whereby glass tubes having a predetermined inner profile can be manufactured precisely, inexpensively and flexibly.

According to the present invention, a method for continuously manufacturing calibrated round or profiled glass tubes having a predetermined inner profile is provided, in which method molten glass emerges from an outlet opening of a melt feed for continuously or quasi-continuously supplying a suitably conditioned molten glass and is drawn over a shaping body so as to form a hollow drawing bulb or drawing onion, which is drawn over a profile forming body positioned downstream of the shaping body, arranged preferably concentrically or in alignment thereto, so that inner circumferential surfaces of the drawing bulb are deformed whilst abutting against outer surfaces of the profile forming body to form the predetermined inner profile. In this way, the inner profile of the glass tube is predetermined by the profile forming body.

According to the invention, a separate profile forming body (i.e. a body defined by closed surfaces in three dimensional space for forming the profile of the glass tube) having a centre substantially in alignment with the centre of the shaping body is thus provided so that the shaping of the hollow, still-deformable drawing bulb and the further profiling of the same to form a calibrated round or profiled glass tube can take place in different zones. Thus, the parameters of the drawing method can be predetermined in a more variable and controlled fashion. At the same time, however, the profile forming body according to the invention can be simply replaced by another suitable profile forming body so that the inner profile of the glass tube to be manufactured can easily be changed. A drawing device according to the invention is thus suitable for manufacturing a plurality of different calibrated round or profiled glass tubes which makes the drawing method or drawing apparatus less expensive and more flexible.

The shaping body and the profile forming body positioned downstream preferably have an outer profile of the same type, for example, circular, elliptical, triangular, square or the like. A maximum external dimension of the profile forming body positioned downstream is preferably smaller than a maximum external dimension of the shaping body arranged upstream. Thus, the drawing bulb formed at the shaping body can become constricted so that the inner circumferential surfaces of the drawing bulb come into contact to the outer surfaces of the profile forming body positioned downstream in a substantially tangentially fashion, to be further deformed there to give the predetermined inner profile.

According to a further embodiment, the shaping body and the profile forming body positioned downstream can also have outer profiles of different types, for example the shaping body can have a round outer profile and the profile forming body can have a triangular profile for example.

The inner circumferential surfaces of the drawing bulb do not reach the upper edge of the profile forming body when abutted against the outer surfaces so that no obstruction of the drawing bulb occurs. The inner circumferential surfaces of the drawing bulb preferably only reach the lower partial section of the profile forming body when abutted against the outer surfaces of the same.

The further shaping of the inner profile of the drawing bulb preferably only takes place at the lower partial section of the profile forming body positioned thereafter, but not over its entire length. The length of the lower partial section is chosen such that the predetermined inner profile of the glass tube is formed sufficiently stably and the walls of the glass tube after leaving the profile forming body are already sufficiently solid or stable so that no subsequent deformation of the glass tube occurs downstream of the profile forming body. In this case, the profile forming body contributes to a further preferably rapid cooling of the glass tube which according to the invention represents an additional degree of freedom during the manufacture of glass tubes. In particular, expensive cooling measures for cooling a profile forming body can be superfluous according to the invention.

In a down-draw method or the Vello method, the molten glass according to the invention is drawn in the direction of gravity from the outlet opening of the melt feed or the melt channel, wherein deviations from this geometry should naturally also be expressly allowed.

The distance between the shaping body and the profile forming body can be varied. Thus, the drawing bulb can be stretched or upset in a suitable manner, which according to the present invention has a direct influence on the wall thickness of the glass tube. E.g. the wall thickness of the glass tube can be made smaller by stretching the drawing bulb whereas the wall thickness of the glass tube can be made larger by upsetting the drawing bulb. In particular, the distance between the shaping body and the profile forming body can be varied according to the invention, such that, to match the respective process parameters, the profile forming body can always be moved into a region where the constriction of the drawing bulb is still sufficiently deformable but the calibrated round or profiled glass tube thus formed no longer undergoes any deformation or is not very strongly deformed, for example, stretched, downstream of the profile forming body. Since the profile forming body according to the invention can be axially adjusted, the drawing method according to the invention can very rapidly be converted to glass tubes having a different wall thickness as well as to a different drawing velocity of the glass tube.

A profile forming body shaft is preferably held displaceably in a longitudinal bore of a shaping body shaft for displacing the profile forming body relative to the shaping body. The longitudinal bore is matched to the shaft of the profile forming body so that said body is guided straight in the longitudinal bore, i.e. during a displacement only its axial position but not its radial position is changed. This ensures that in all positions of the profile forming body, shaping body and profile forming body are arranged in alignment so that the drawing bulb can abut very uniformly against the profile forming body and uniform wall thicknesses can be formed. Special mounting or retaining means are provided to guide the shaft of the profile forming body straight in the longitudinal bore.

Thus, glass tubes having particularly uniform wall thicknesses can be manufactured according to the invention.

The longitudinal bore or a longitudinal bore provided within the holding device of the profile forming body is preferably designed so that process air and/or inert protective gas, for example, nitrogen or argon can be passed to the profile forming body. The inert gas prevents oxidation and/or corrosion on the underside of the profile forming body which could otherwise result in uncontrolled rounding at the edge of the profile forming body and thus rough or streaked glass surfaces.

In general it is to be appreciated that the glass tube can be heated in the area of the profile forming body by suitable heating means to a temperature above the softening point of the glass, if the glass tube should have cooled down excessively, i.e. down to a temperature below the softening point, e.g. in case the distance between the shaping body and the profile shaping body is relatively large.

In order to simply convert the drawing apparatus according to the invention to glass tubes having a different inner profile, the shaping body can be arranged axially displaceably in the area of the outlet opening to stop the molten glass from leaving the outlet opening at least temporarily. In this position the profile forming body is accessible from the underside of the drawing device and can be exchanged simply, for example by removing the profile forming body from the rod and fixing a new profile forming body on the rod or by simply exchanging the rod together with the profile forming body.

The profile forming body can also be round. The profile forming body can be manufactured for example on a lathe with very tight tolerances and almost perfectly round. Using this type of profile forming body, precision glass tubes can be manufactured according to the invention in a continuous method, where the inside diameters have approximately the same tight tolerances as the round profile forming body. Tubes having such tight tolerances cannot be produced in the conventional continuous drawing method according to the prior art without profile forming bodies. Glass tubes having such tight tolerances are usually manufactured according to the prior art very expensively and uneconomically using the so-called KPG method (Küppers precision glass tubes) where each tube is individually shrunk on a metal mandrel.

When the drawing method according to the invention is applied to the known down-draw method or Vello method, the profile forming body and the shaping body are held rotationally fixedly relative to the outlet opening of the melt opening. Of course, the drawing method according to the invention can also be applied to the known Danner method in which case the profile forming body is arranged downstream from a slowly rotating tubular body onto which a continuous strand of molten glass runs from the outlet opening of the molten glass feed to form a deformable tubular body. In this case, the profile forming body is preferably rotated synchronously with the slowly rotating tubular body.

In principle it also feasible according to the invention that the still-soft glass tube is deflected horizontally downstream of a drawing apparatus according to the invention and is drawn off horizontally by a drawing device in the known fashion for further processing.

A further aspect of the present invention relates to a device for continuously manufacturing calibrated round or profiled glass tubes having a predetermined inner profile for implementing the aforesaid method.

A further aspect of the present invention relates to a calibrated round or profiled glass tube manufactured by a method wherein molten glass emerges from an outlet opening of a melt feed for continuously or quasi-continuously supplying a suitably conditioned molten glass and is drawn over a shaping body so as to form a hollow drawing bulb, which is drawn over a profile forming body positioned downstream of the shaping body, arranged preferably concentrically or in alignment thereto, so that inner circumferential surfaces of the drawing bulb are deformed whilst abutting against outer surfaces of the profile forming body to form the predetermined inner profile. In this way, the inner profile of the glass tube is predetermined by the profile forming, body. Further parameters for characterising such a glass tube are as described previously in connection with the method.

A further aspect of the present invention relates to a glass tube of the aforementioned kind, wherein the maximum fluctuation of the inside diameter is less than about 0.4% of the inside diameter of the glass tube, more preferably less than about 0.25% of the inside diameter of the glass tube and even more preferably less than about 0.2% of the inside diameter of the glass tube. Generally speaking, according to the present invention the maximum fluctuation of the inside diameter can be less than about 0.1% of the inside diameter of the glass tube.

A further aspect of the present invention relates to a glass tube of the aforementioned kind, wherein the maximum fluctuation of the outside diameter is less than about 0.45% of the outside diameter of the glass tube, more preferably less than about 0.3% of the outside diameter of the glass tube and even more preferably less than about 0.25% of the outside diameter of the glass tube. Generally speaking, according to the present invention the maximum fluctuation of the outside diameter can be less than about 0.15% of the outside diameter of the glass tube.

A further aspect of the present invention relates to a calibrate profiled glass tube having a rectangular cross-section characterised by corner radii down to about 0.1 mm with a side ratio, i.e. a ratio of height to width of the glass tube profile, of about 1:1 to about 10:1.

A further aspect of the present invention relates to a calibrated round or profiled glass tube characterised by a maximum fluctuation of the inside diameter of less than about 0.11 mm and/or by a maximum fluctuation of the external dimension of less than about 0.45 mm, especially with an outside diameter in the range of about 20 mm to about 100 mm, preferably in the range of about 40 mm to about 80 mm, preferably about 60 mm, and with a wall thickness in the range of about 1 mm to about 3 mm, preferably of about 2 mm. However, the method and apparatus according to the present invention are not limited at all to the above mentioned dimensions, but can also applied to glass tubes having larger or smaller outer diameters as well as to glass tubes having a larger or smaller wall thickness.

BRIEF DESCRIPTION OF THE DRAWINGS

The invention is described subsequently in an exemplary fashion and with reference to the appended drawings, from which further features, advantages and problems to be solved are deduced and wherein.

Throughout the figures identical reference numbers denote identical or substantially equivalent elements or groups of elements.

DETAILED DESCRIPTION OF THE INVENTION

Figure 1A:
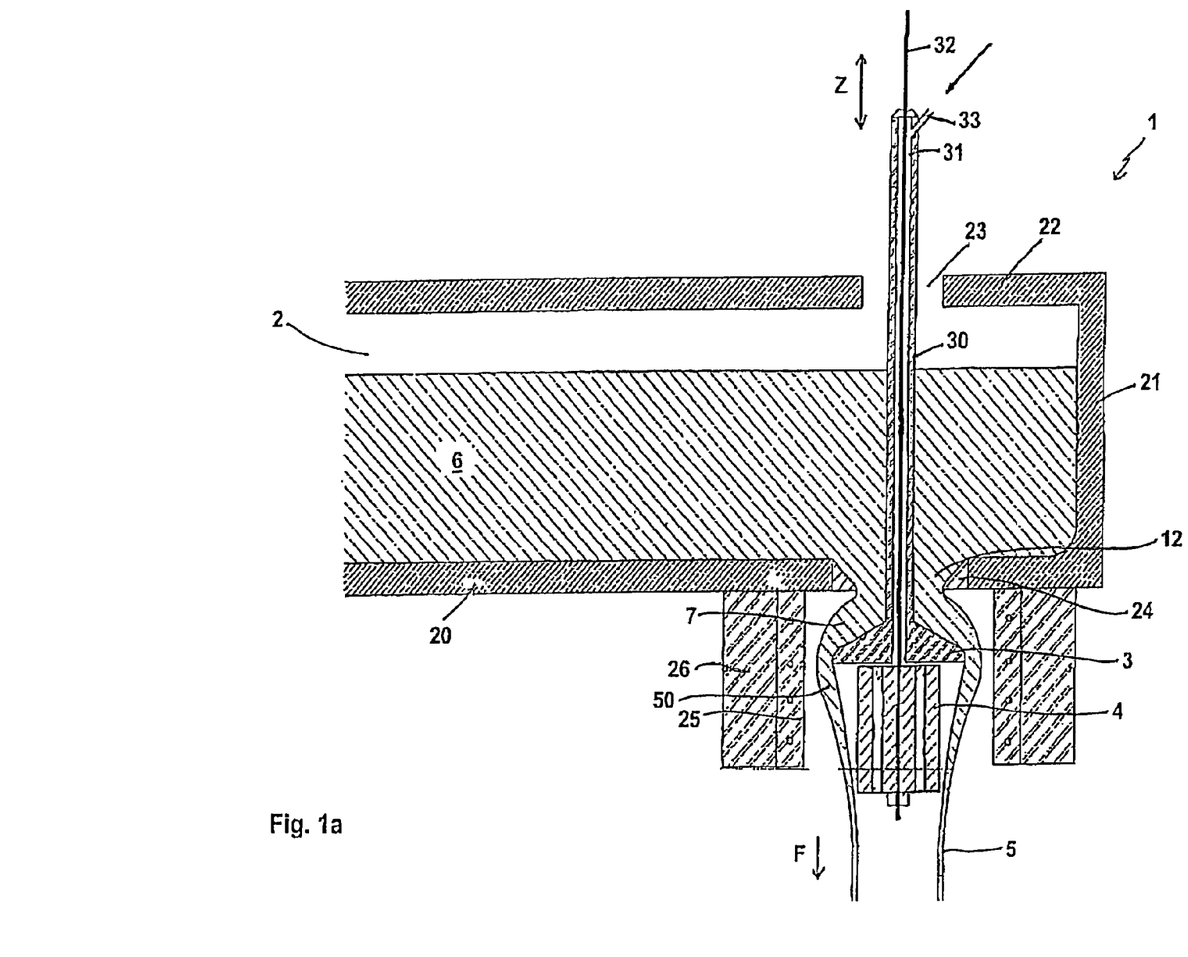
FIGS. 1a and 1b are schematic sectional views showing a apparatus for manufacturing calibrated round or profiled glass tubes according to the present invention in two different positions of the profile forming body.
Figure 1B:
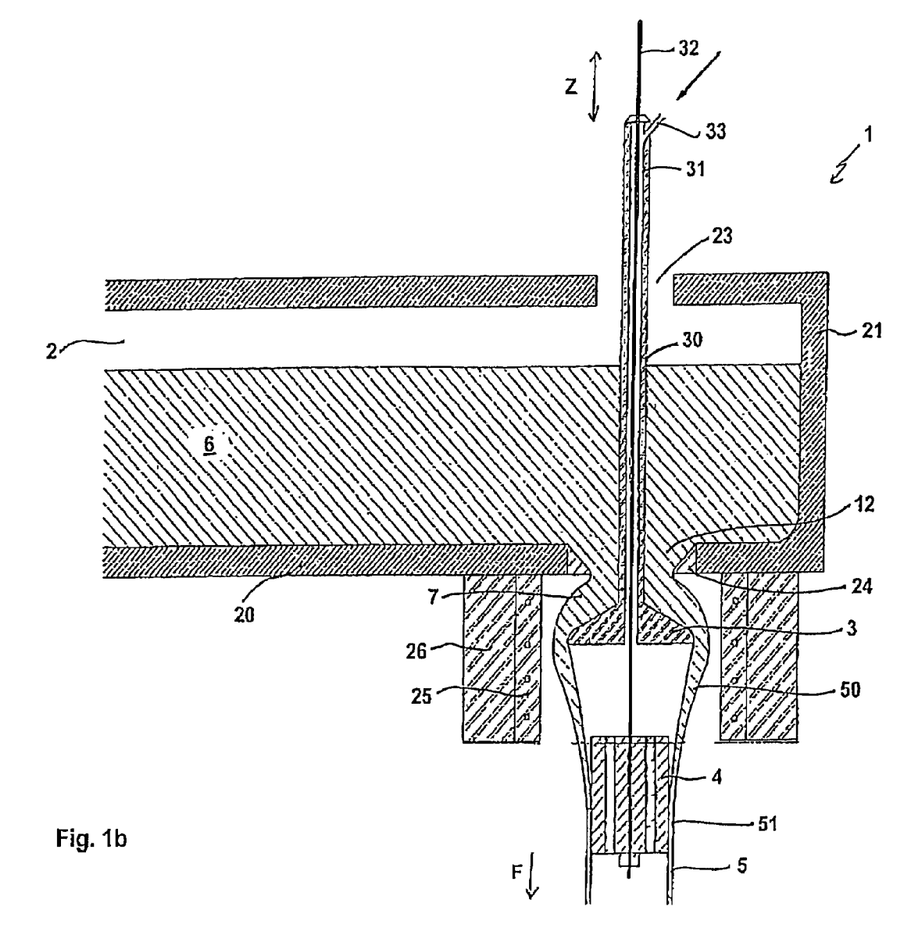

FIG. 1a is a schematic sectional view of an apparatus for manufacturing calibrated round or profiled glass tubes according to the present invention in a position where a profile forming body almost abuts against the shaping body. FIG. 1b shows the apparatus according to FIG. 1a in a position where the profile forming body is arranged at a distance from the shaping body.

According to FIG. 1a, the drawing device designated overall as 1 comprises a melt channel 2 acting as a melt feed, formed by a bottom 20, a side wall 21 and an upper cover 22 to supply molten glass 6 therein. The melt channel 2 is supplied continuously or discontinuously by a melting furnace not shown and supplies suitably conditioned molten glass to the outlet opening 12. At the lower end of the melt channel 2 an outlet opening 12 for the molten glass 6 is defined by a an outlet ring 24. According to FIG. 1a, the outlet ring 24 tapers radially inwards so that the inner contour of the outlet ring 24 is defined by an edge. The outlet ring 24 can have a round profile or it can have a non-round profile, for example, a rectangular or elliptical profile.

According to FIG. 1a, a conical shaping body 3 is arranged downstream from the outlet opening 12 of the melt channel 2, which is affixed at the lower end of a substantially tubular shaping body shaft 30 or unitarily formed therewith. As indicated by the double arrow Z, the shaping body shaft 30 can be moved vertically up and down to close the outlet opening of the outlet ring 24 or at least narrow the annular gap between the shaping body 3 and the outlet ring 24 to such an extent that no melt 6 can emerge from the melt channel 2. The adjustment of the shaping body 3 over the shaft 30 is also used to adjust the annular gap between the outlet ring 24 and the shaping body 3 such that the quantity of glass required to draw the tube passes through. The shaft 30 is also adjustable in the horizontal (xy) direction and can thus be centred inside the outlet ring 24 so that the glass tube acquires a uniform wall thickness.

According to FIG. 1a, the upper end of the shaping body shaft 30 projects beyond the upper cover 22 so that an adjustment device (not shown) can cooperate with the upper end of the shaping body shaft 30 or the rod 32 to suitably adjust the height position of the shaping body 3.

According to FIG. 1a, a concentric profile forming body 4 is provided downstream, in the direction of gravity and the draw-off direction of the glass tube 5, said profile forming body being affixed exchangeably on the lower end of the profile forming body shaft or the rod 32. The profile forming body 4 is arranged so that it abuts against the lower end of the shaping body 3 in FIG. 1a and is arranged at a distance from the lower ends of the shaping body 3 in FIG. 1b.

According to FIG. 1a, an axial inner bore 31 is provided within the shaping body shaft 30 which receives the shaft of the profile forming body (hereinafter the rod) 32. The inner bore 31 runs concentrically to the shaping body 3 and the profile forming body 4. The inner bore 31 is constructed so that the rod 32 is guided straight in the inner hole 31 and abuts circumferentially at least in sections on the inner circumferential surfaces of the inner bore 31 so that in every height position of the profile forming body 4, the shaping body 3 and the profile forming body 4 are arranged in alignment to one another, i.e., the profile forming body 4 is exclusively adjusted axially but not radially when changing the height position of the same.

The height position of the profile forming body 4 can be adjusted manually by an operator by axially displacing the rod 32 within the inner bore 31. Of course, a mechanical or electric-motor-actuated adjusting device can be provided for this purpose at the upper end of the inner bore 31 or the rod 32. Mechanical displays or scales (not shown) are provided at the upper end of the drawing device 1 to indicate the height position of the shaping body 3 and the profile forming body 4. Of course, the respective height position of the shaping body 3 and the profile forming body 4 can also be detected by a detector, for example, an optical, inductive or capacitive scanning device, to be indicated on a display.

According to FIG. 1a, a cylindrical heating device 25 and cylindrical thermal insulation 26 surrounding the cylindrical heating device 25 are provided at the lower end of the drawing device 1 in order to surround at least the shaping body 3 and preferably both the shaping body 3 and at least the upper end of the profile forming body 4 to predetermine defined temperature conditions downstream of the outlet opening of the melt channel 2. Of course, for this purpose the heating device 25 can contain a plurality of independently operable heating zones in the longitudinal direction. With such a heating device or comparable heating devices the glass tube can be heated again, e.g. also to a temperature above the softening point if the glass tube should have cooled down excessively on the profile forming body.

Figure 2:
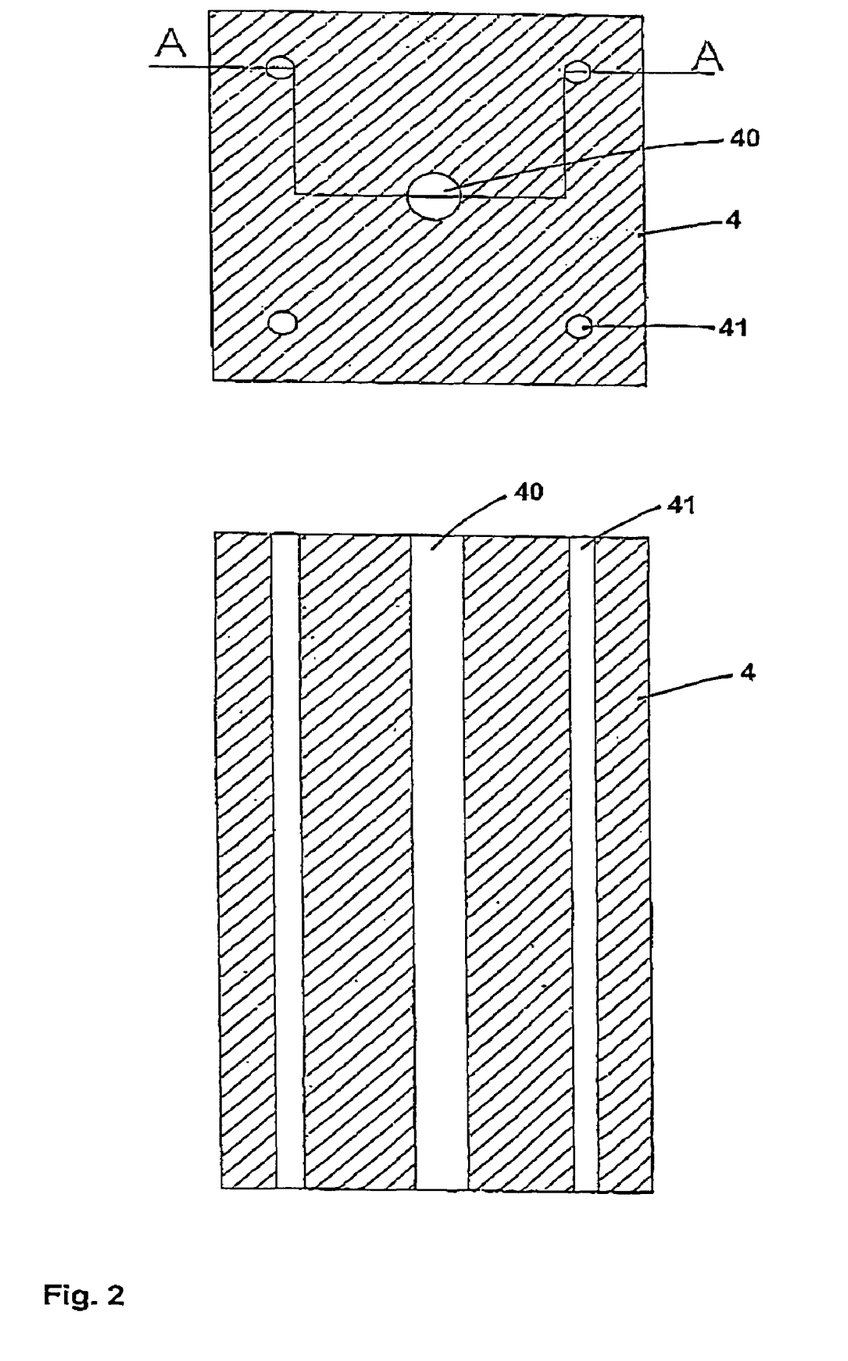
FIG. 2 is a schematic sectional view from above and in a section along the line A-A of a profile forming body according to a first embodiment of the present invention.
Figure 3:
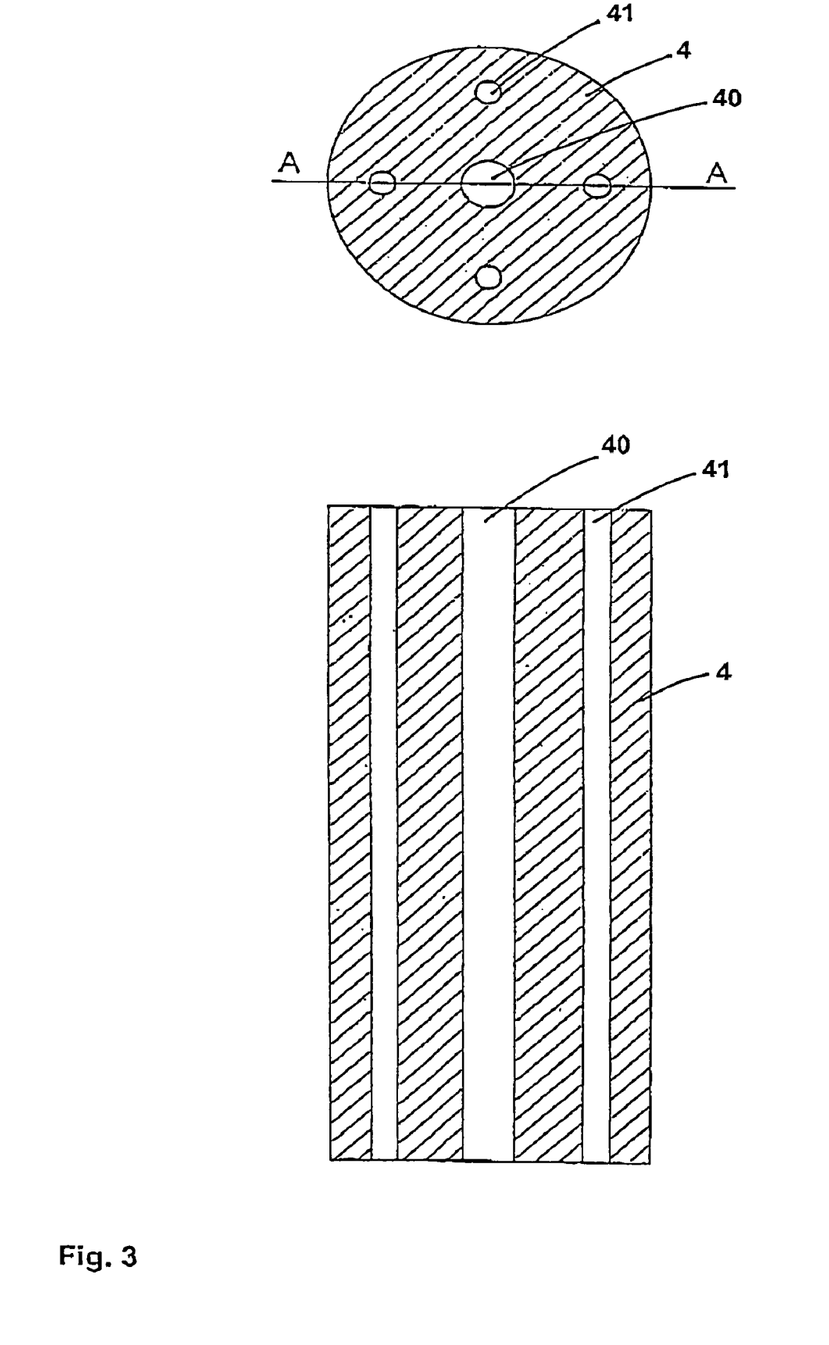
FIG. 3 is a schematic sectional view from above and in a section along the line A-A of a profile forming body according to a second embodiment of the present invention.
Figure 4:
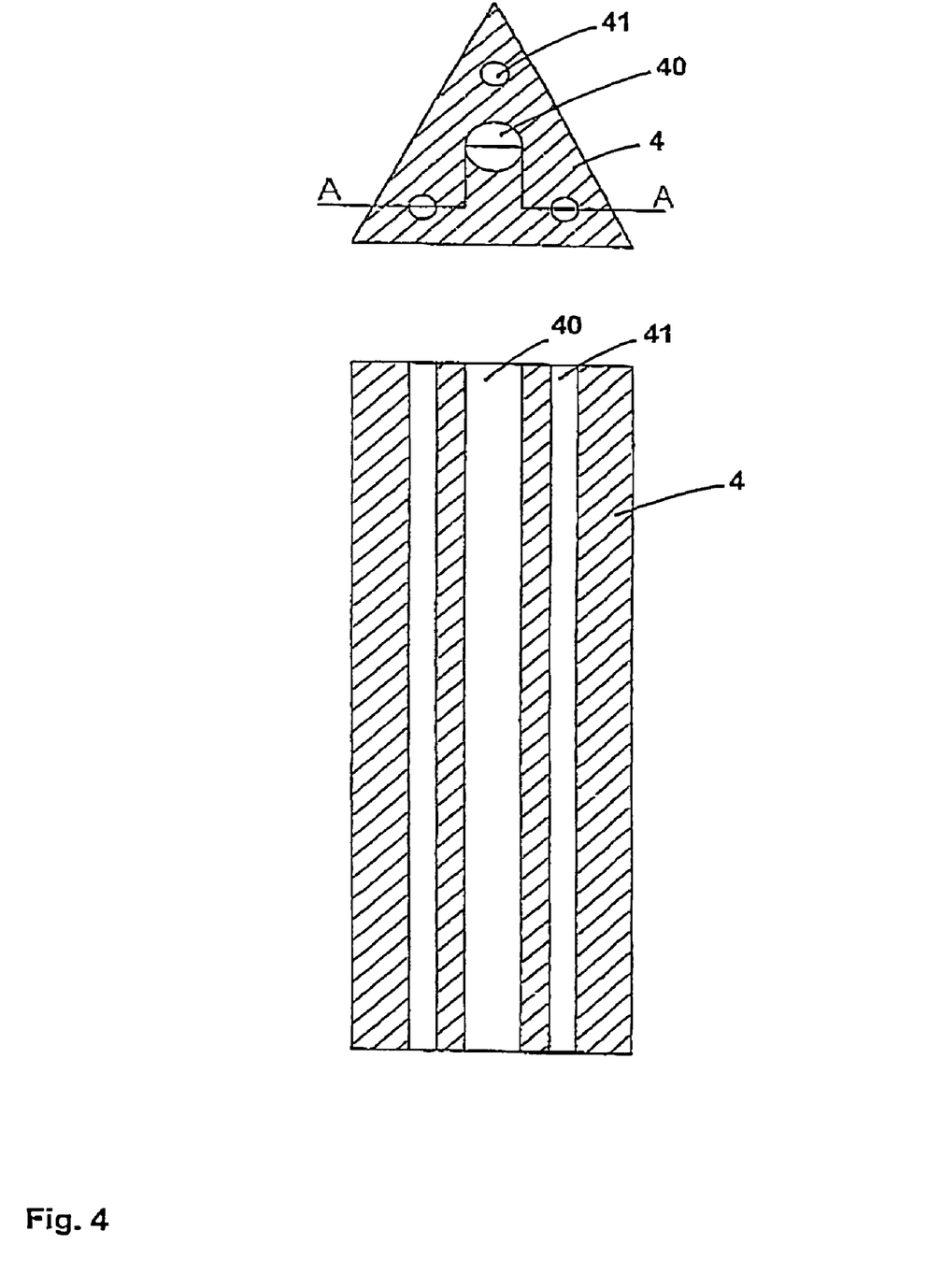
FIG. 4 is a schematic sectional view from above and in a section along the line A-A of a profile forming body according to a third embodiment of the present invention.

FIGS. 2 to 4 show various embodiments of a profile forming body according to the invention respectively in a schematic side view and in a section along the line A-A. As shown in FIG. 2, the profile forming body 4 is a solid body, i.e. a member defined by a closed 3-dimensional surface, in which a fixing opening 40 for fixing on the rod 32 and a plurality of passages 41 for process air and/or inert gas are formed in point symmetry to the fixing opening 40. At least the gas passages 41 extend over the total height of the profile forming body 4. As shown in FIG. 1, process air or an inert gas, for example, nitrogen or argon, can be fed to the underside of the profile forming body 4 to prevent undesirable oxidation or corrosion on the underside of the profile forming body 4. The temperature conditions downstream of the shaping body 3 can also be influenced by means of the process air or the protective gas, for example, a certain cooling can be achieved.

According to the invention the profile forming body 4 is made of a suitably heat-resistant or refractory material which is not wetted by the molten glass at high temperatures. The profile forming body 4 according to the invention preferably consists of a polished graphite or of another non-silicate material having a hexagonal crystal structure, for example of boron nitride. In order to prevent the formation of grooves on the inside of the glass tube 5, the lower edge of the profile forming body 4 can be chamfered or rounded. The shaping body 3 according to the invention consists of a highly temperature-resistant or refractory material which barely reacts or does not react at all with the molten glass 6, for example, of a precious metal such as platinum for example, a precious metal alloy, for example, a platinum alloy, or of a highly temperature-resistant steel. As can easily be seen from FIG. 1, the shaping body 3 can also be provided inside the melt channel 2 to close the annular gap between the shaping body 3 and the outlet ring 24 from above or to regulate this gap.

As can easily be deduced from a comparison of FIGS. 2 to 4, the profile forming body 4 can have an almost arbitrary outer profile so that a large plurality of different glass tubes having round or non-round inner profiles can be manufactured according to the invention. According to FIGS. 2 to 4, the outer profile of the profile forming body 4 does not change in its longitudinal direction. This is not necessary however. Rather the profile forming body 4 can fundamentally also taper or broaden in its longitudinal direction. However, care should be take to ensure that a section of constant outer profile and a certain minimum length is provided at the lower edge of the profile forming body 4 because the inner profile of the glass tube is substantially determined by the outer profile of the profile forming body 4 at its lower end. Parallel drawing of the glass tube from the profile forming body can only be achieved if a section at the lower end of the profile forming body 4 having a constant outer profile has a sufficient length.

In certain cases, it is preferable according to the invention if the inner contour of the outlet ring 24, the outer contour of the shaping body 3 and the outer profile of the profile forming body 4 are constructed as corresponding to one another. Basically however, the outer profile of the profile forming body 4 can also differ from the outer contour of the shaping body 3. For example, the outer contour of the shaping body 3 can be circular whereas the outer profile of the profile forming body 4 is triangular, as shown in FIG. 4. However, in order to ensure uniform wall thickness of the glass tube 5 (FIG. 1), care must always be taken to ensure a concentric arrangement of shaping body 3 and profile forming body 4. In other words, the geometrical centre points of the shaping body 3 and profile forming body 4 are aligned according to the invention on a line running parallel to the drawing direction of the molten glass or the glass tube 5 so that symmetrical conditions can be achieved downstream of the outlet opening of the melt channel 2.

The following process is adopted to draw a calibrated round or profiled glass tube: the melt feed or melt channel 2 supplies suitably conditioned molten glass 6. By varying the height position of the shaping body 3, the annular gap between the shaping body 3 and the outlet ring 24 is suitably predetermined so that a sufficient drawing speed and a sufficient wall thickness of the glass tube 5 can be achieved with a drawing force F. The profile forming body 4 is arranged at a suitable distance from the front end of the shaping body 3 so that the molten glass 7 emerging or drawn from the outlet opening 12 forms a hollow drawing bulb 50 downstream of the shaping body 3, whose inner circumferential surfaces come to rest against the lower partial section of the profile forming body 4, as shown in FIG. 1b. The drawing bulb 50 is in any case still sufficiently soft and deformable at the upper end of the contact region 51 on the profile forming body 4.

As the glass tube 5 is drawn further, the drawing bulb 50 becomes constricted until finally at the lower end of the profile forming body 4, inner circumferential surfaces of the drawing bulb 50 come to rest against the outer surfaces of the profile forming body 4. The contact region 51 thus formed, having a constant outer profile, preferably does not extend over the total length of the profile forming body 4 but only over a certain length on the lower partial section of the same. The inner profile of the glass tube 5 is determined by the contact of the inner circumferential surfaces of the drawing bulb 50 on the outer surfaces of the profile forming body 4. During further drawing the outer walls of the glass tube 5 can be stretched slightly further downstream of the profile forming body 4 until the temperature of the glass tube 5 has dropped to a temperature below the softening point. The temperature conditions downstream of the outlet opening of the melt channel 2 can be additionally controlled by means of the heating device 25.

In order to replace the profile forming body 4 by a profile forming body having a different outer profile, the glass flux from the outlet ring 24 is first stopped by raising the shaping body 3 and closing the outlet opening of the melt channel 2. The profile forming body 4 is then removed from the rod 32 and a new profile forming body 4 is affixed to the rod 32 or the entire rod 32 together with the profile forming body 4 affixed thereto is exchanged. The outlet opening 12 of the melt channel 2 is then sufficiently opened again by lowering the shaping body 3. The molten glass is drawn at a predetermined drawing speed via the shaping body 3. The height position of the profile forming body 4 is then suitably varied by moving the rod 32 axially until suitable parameters are found for the position of the profile forming body 4, the temperature and the drawing rate to produce a glass tube 5 having a predetermined inner profile. In particular, the wall thickness of the glass tube 5 can be influenced by the temperature, draw-off speed, throughput and position of the shaping body 3.

In particular, the following parameters which can be easily varied individually or in a coordinated fashion are available to change the properties of the glass tube: the temperature of the molten glass 6 in the melt channel 2 or at the outlet opening of the same; the inside diameter of the outlet opening 12 and the outside diameter of the shaping body 3; the width of the annular gap between the shaping body 3 and the outlet ring 24; the outside diameter and the outer profile of the profile forming body 4; the heating power of the heating device 25; the length of the profile forming body 4; the distance between the lower end of the shaping body 3 and the upper end of the profile forming body 4, and the throughput of the molten glass.

According to the invention, the temperature conditions are adjusted so that the viscosity of the molten glass in the area of the shaping body 3 is approximately in the range of about $2 \times 10^4$ to $10^6$ dPas and the viscosity of the molten glass at the lower end of the profile forming body 4 is about $10^6$ dPas but is in any case lower than the viscosity at the Littleton point ($10^{7.6}$ dPas) of the glass. Thus, the temperature first goes below the softening point of the glass downstream of the profile forming body 4. For this purpose cooling devices (not shown) can be provided downstream of the profile forming body 4.

As can easily be seen from FIG. 1b, the wall thickness of the glass tube in the case of a predetermined annular gap is substantially determined by the throughput, the temperature and the drawing speed. In certain cases, it can be provided that slight further deformation of the glass tube, namely further stretching, occurs downstream of the profile forming body 4. These conditions can easily be suitably adjusted, especially by the temperature and drawing force so that the ultimately attainable inner profile and outer profile can be predetermined with high precision. Preferably however, the temperature conditions and the position of the profile forming body 4 are selected so that no subsequent deformation of the glass tube occurs downstream of the profile forming body.

The principle of using an additional profile forming body positioned downstream of the shaping body according to the invention can naturally also be applied to the known methods for continuous drawing of glass tubes from the prior art, especially to the Vello method and the Danner method. This is explained subsequently as an example with reference to FIGS. 5a and 5b for a device for the known Danner method.

Figure 5A:
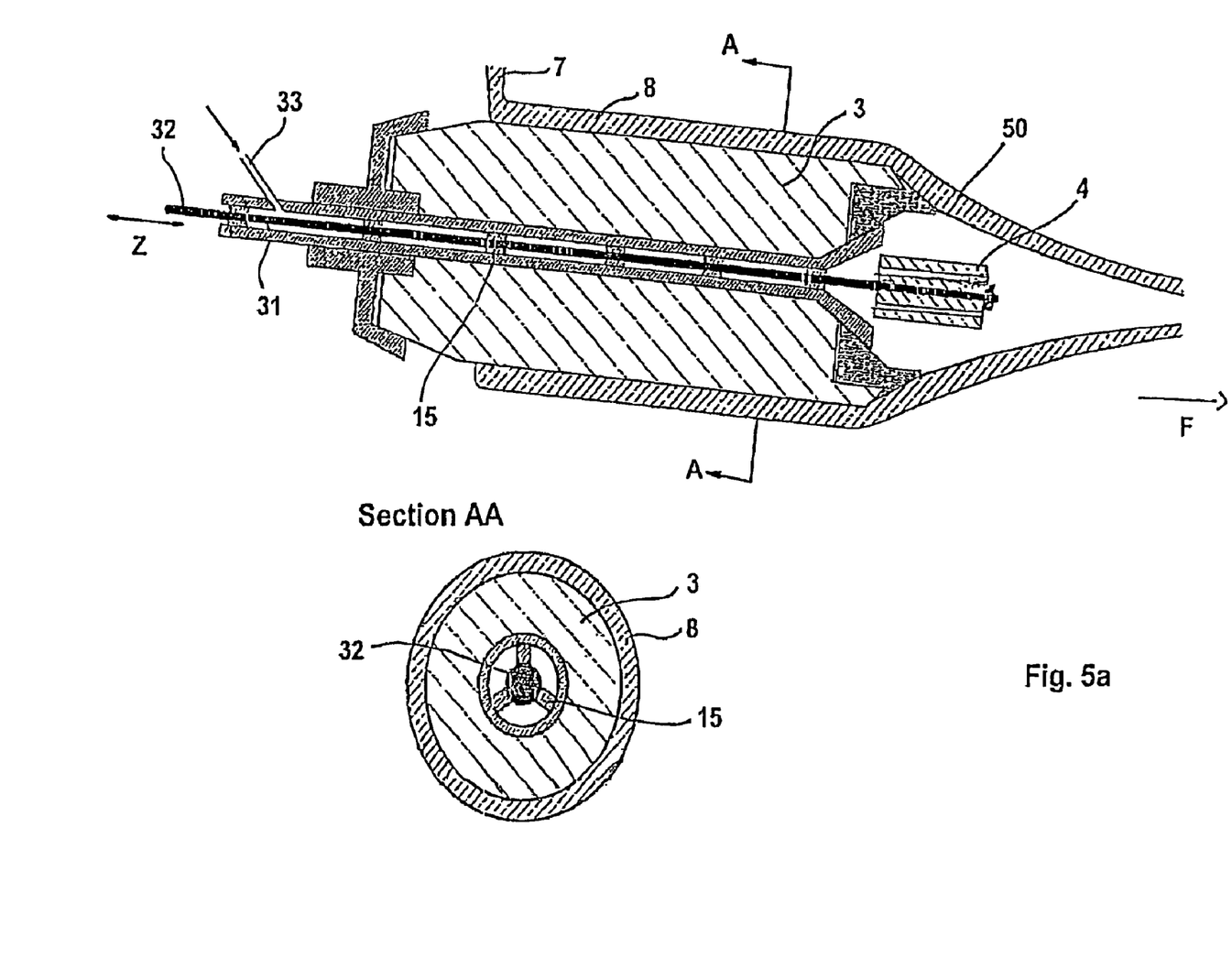
FIGS. 5a and 5b respectively illustrate a schematic longitudinal section and a schematic sectional view along the line A-A of another apparatus for manufacturing calibrated round or profiled glass tubes according to the present invention.
Figure 5B:
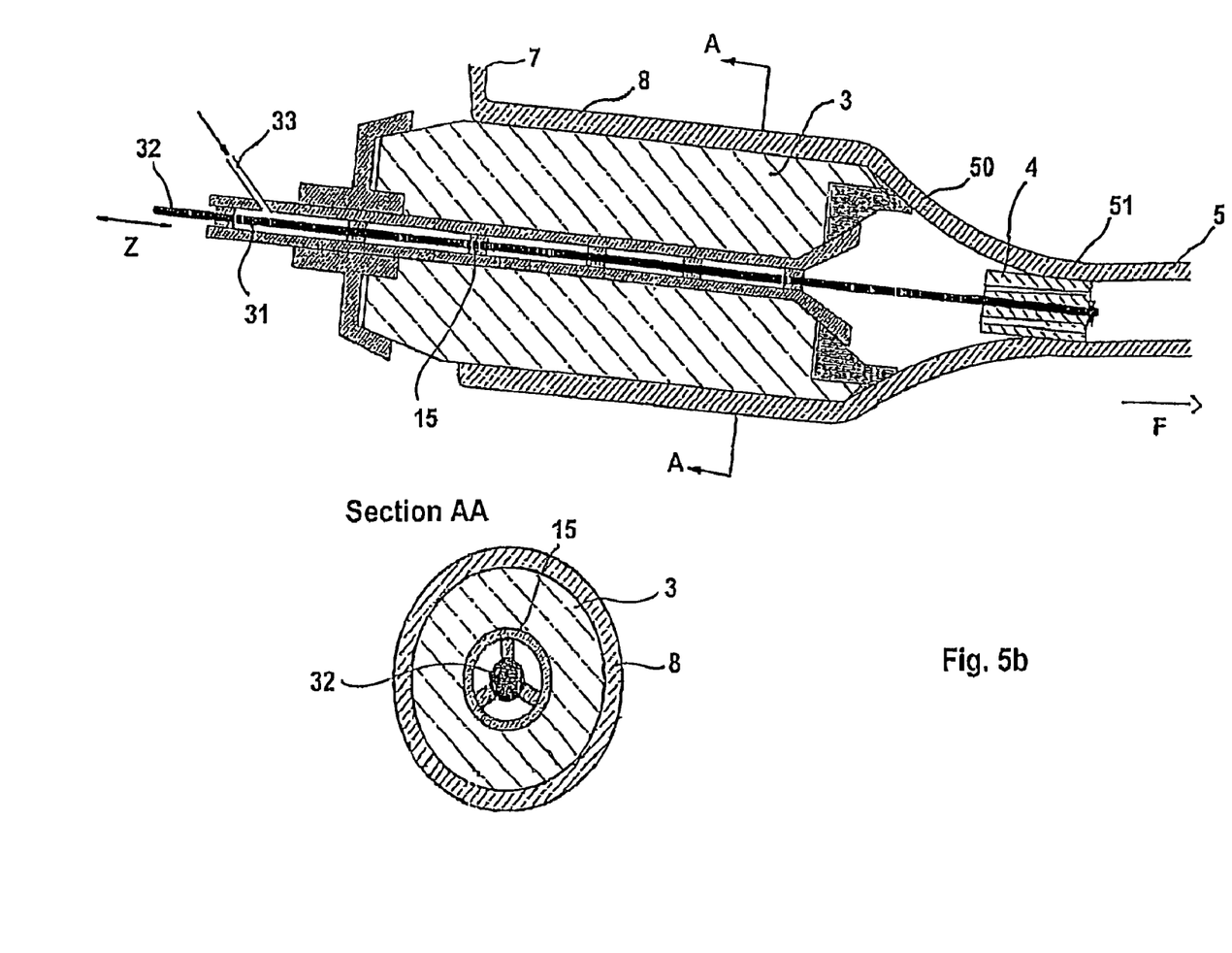

FIGS. 5a and 5b each show a device for manufacturing calibrated round or profile glass tubes according to a second embodiment of the present invention respectively in a schematic longitudinal section and in a schematic sectional view along the line A-A. According to FIG. 5a, the profile forming body is arranged at a relatively short distance from a lower end of the tubular shaping body and according to FIG. 5b the profile forming body is arranged at a large distance from a lower end of the tubular shaping body.

According to FIG. 5a, the shaping body 3 is a slowly rotating tube arranged slightly obliquely in a heat-insulating holder which is not shown. The tube 3 is driven by an electric motor (not shown). The drive shaft of the tube 3 is a hollow shaft in which a rod 32 is held such that it can be displaced longitudinally and is guided straight at retaining or mounting sections 15. The profile forming body 4 is arranged at the lower end of the rod 32 at a predetermined distance from the lower end of the tube 3. The profile forming body 4 is coupled to the rotating drive of the tube 3 via gears preferably arranged outside the hot area of the device but which can basically also be provided at the lower end of the tube 3 so that the tube 3 is turned synchronously with the profile forming body 4. The profile forming body 4 can be arranged rotationally fixedly by uncoupling the gears. As is indicated by the double arrow Z, the distance between the profile forming body 4 and the lower end of the tube 3 can be suitably predetermined so that the inner circumferential surfaces of the still-deformable drawing bulb 50 in contact with the outer surfaces of the profile forming body 4 in the contact region 51 (see FIG. 5b) are deformed to give a glass tube having an inner profile predetermined by the profile forming body 4.

For drawing a glass tube, a continuous strand 7 of molten glass runs from an outlet ring (not shown) of a melt channel, not shown, onto the outer circumference of the rotating tube 3 so that the emerging molten glass is formed into a continuous molten glass coating 8 having a substantially constant wall thickness. At the lower end of the rotating tube 3 the drawing bulb 50 becomes constricted before being ultimately deformed in contact with the profile forming body 4 to form the glass tube.

Although not shown in the figures, the glass tube 5 is deflected horizontally downstream from the drawing device and drawn off by a drawing device.

As the person skilled in the art can easily see from the previous description, the method according to the invention or the apparatus according to the invention is suitable for manufacturing calibrated round or profiled glass tubes from any types of glass. The glass tubes can be produced inexpensively and flexibly using almost all known drawing methods with fixed dimensions or tolerances. The minimum and maximum outside diameters and wall thickness that can be achieved are in principle only subject to the limitations of the drawing device used in each case. Expensive series of tests conducted by the inventor have shown that for tubes having a rectangular cross-section, values for corner radii down to about 0.1 mm with a side ratio of about 1:1 to 10:1 or more and a wall thickness of at least about 0.1 mm can easily be produced. Withdrawal speeds of about 34 mm/s can be achieved with draw-off quantities of about 160 kg/h.

EXEMPLARY EMBODIMENT 1

It can be seen from the following exemplary embodiment that glass tubes having more precise profiles and smaller tolerances can be manufactured using the drawing method according to the invention.

For this purpose, a glass tube having otherwise the same parameters was drawn using the conventional down-draw method without using the profile forming body according to the invention positioned downstream of a drawing needle (free forming). The conditions were selected so that a glass tube having an inside diameter of 59.25 mm should be freely formed. Measurements of the inside diameter showed that this fluctuated along the length of the glass tube between a minimum value of about 58.70 mm up to a maximum value of about 59.85 mm, corresponding to an average fluctuation of 1.15 mm in total.

For comparison, under otherwise the same conditions a calibrated glass tube was manufactured using the drawing method according to the invention i.e., with a profile forming body positioned downstream of a drawing needle. In this case, a fluctuation of the inside diameter of less than about 0.11 mm was observed. Overall the fluctuations of the internal dimensions were smaller by about a factor of 10 as compared to conventional drawing methods.

The fluctuations of the outside diameter were also determined. The freely formed glass tube should be drawn with an outside diameter of 60.00 mm. A minimum outside diameter of about 59.8 mm and a maximum outside diameter of about 60.3 mm were measured, which corresponded to a maximum fluctuation of the outside dimension of about 0.45 mm.

For comparison in a glass tube manufactured using the method according to the invention, a minimum outside diameter of 60.02 mm and a maximum outside diameter of about 60.18 mm was measured which corresponded to a fluctuation of the outside dimension of about 0.16 mm. The fluctuation of the outside dimension using the drawing method according to the invention was smaller by about a factor of 3.

EXEMPLARY EMBODIMENT 2

Using a method according to the present invention, calibrated glass tubes with a total length of 54 m having an outer diameter of 80 mm, a wall thickness of 2.5 mm and an inner diameter of 75 mm were drawn. More specifically, a plurality of single glass tubes with a respective length of 1.5 m was drawn. The outer diameter was measured continuously over the total tube length. In order to avoid slicing of the glass tubes, the inner diameter was measured only at the respective tube ends, as a fluctuation of the inner diameter directly results in a corresponding fluctuation of the outer diameter of the glass tube under the assumption of a constant wall thickness. The results of the measurement of the maximum and minimum outer diameter of the glass tube are summarized in FIG. 6, wherein the single glass tubes are numerated.

Figure 6:
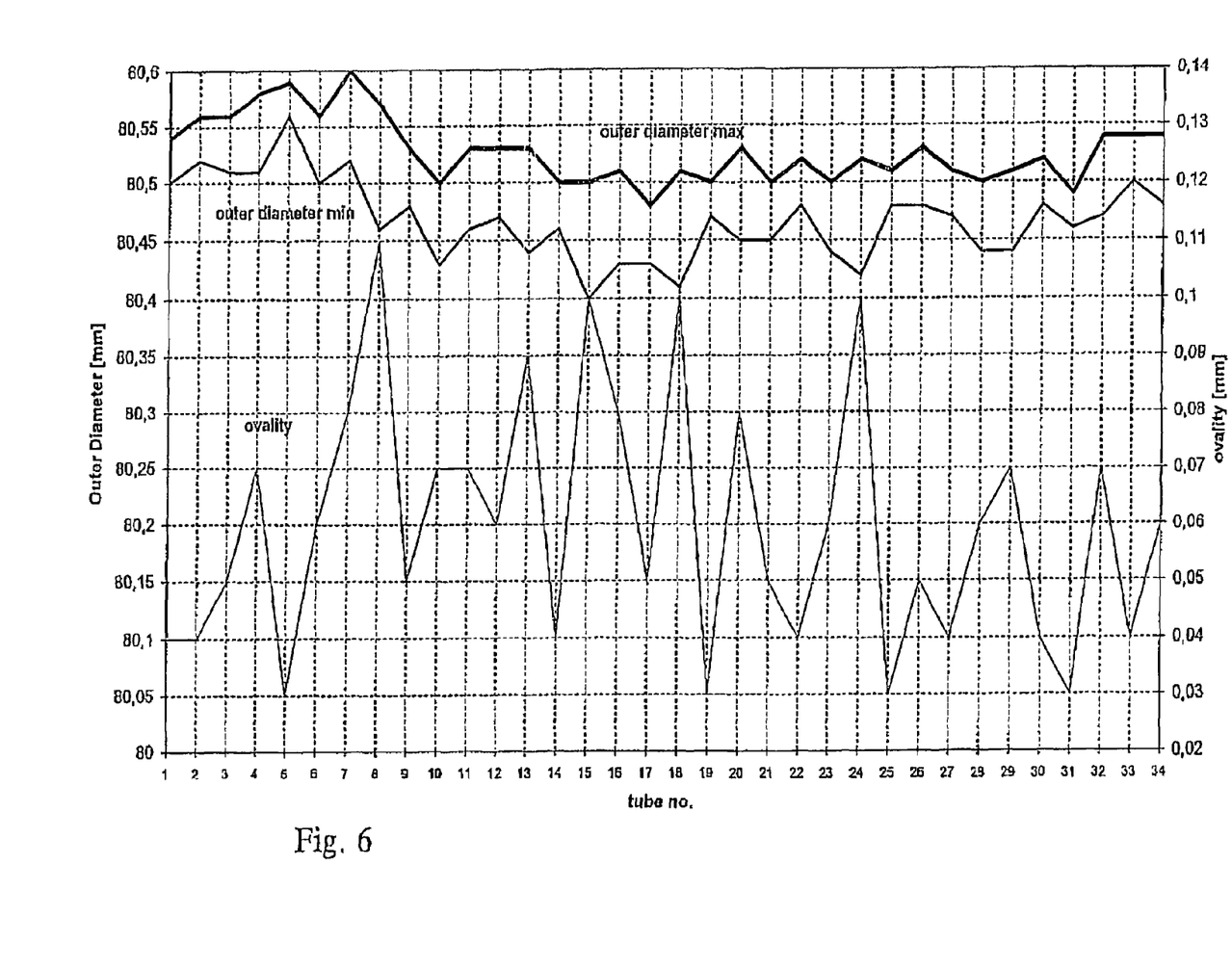
FIG. 6 is a graphical representation of results of a measurement of the minimum and maximum outer diameter of a glass tube according to an embodiment of the present invention.

Referring to FIG. 6, the maximum outer diameter varied between 80.6 mm and about 80.48 mm. Furthermore, the minimum outer diameter varied between 80.55 mm and 80.40 mm. At the same time the outer diameter varied far less. In general, the maximum fluctuation of the outer diameter was less than about 0.25% of the outer diameter of the glass tube.

As further measurements revealed, according to the present invention the maximum fluctuation of the outer dimension can be up to less than about 0.15% of the outer dimension of the glass tube and the maximum fluctuation of the inner dimension of the glass tube can be up to less than about 0.1% of the inner dimension of the glass tube, which is far less than achievable with convention drawing methods.

Since glass tubes having almost arbitrary inner profiles can be manufactured with very small tolerances using the drawing method according to the invention, new fields of application are opened up according to the invention for calibrated round or profiled glass tubes. In addition to the known applications, mention may be made for example of uses in interior design or in the furniture industry, for example as guide railings (the smooth, ridgeless surfaces yield very beautifully shaped interior design elements) or as decorative elements in interior design, for manufacturing illuminants having more precise dimensions and therefore better and controlled lighting properties, for manufacturing decorative illuminants, for manufacturing covers for illuminants, and for manufacturing bottles, containers and the like, for example, for the pharmaceutical industry.

What is claimed is:

1. A method for continuously manufacturing a calibrated round or profiled glass tube having a predetermined inner profile, in which method: molten glass emerges from an outlet opening of a melt feed and is drawn over a shaping body so as to form a hollow drawing bulb, wherein the hollow drawing bulb is drawn over a profile forming body positioned downstream of the shaping body by means of a drawing device so that inner circumferential surfaces of the drawing bulb are deformed while abutting against outer surfaces of the profile forming body to form the predetermined inner profile, and wherein a wall thickness of the glass tube is varied by changing a distance between the shaping body and the profile forming body by a means for changing said distance.

2. The method according to claim 1, wherein the molten glass is drawn from the outlet opening in the direction of gravity.

3. The method according to claim 1, wherein the distance between the shaping body and the profile forming body is changed to vary a length over which the inner circumferential surfaces of the drawing bulb abut against the outer surfaces of the profile forming body.

4. The method according to claim 1, wherein said means for changing said distance changes the distance between the shaping body and the profile forming body by moving a shaft in a longitudinal bore of a shaping body shaft wherein the shaft is guided straight within the longitudinal bore.

5. The method according to claim 4, wherein at least one of process air and protective gas is passed through the longitudinal bore to the profile forming body.

6. The method according to claim 1, wherein the shaping body is arranged in the area of the outlet opening and is displaced axially to stop the molten glass from emerging from the outlet opening and to allow the profile forming body to be exchanged.

7. The method according to claim 6, wherein the profile forming body and the shaping body are non-rotatable relative to the outlet opening of the melt feed.

8. The method according to claim 1, wherein the shaping body is formed by a slowly rotating, tubular body onto which a continuous strand of molten glass runs from the outlet opening so that a drawing bulb is formed at a lower end of the slowly rotating body.

9. The method according to claim 8, wherein the profile forming body is rotated synchronously with the slowly rotating tubular body.

10. The method according to claim 1, wherein the glass tube having the predetermined inner profile after or profiling at the profile forming body is deflected horizontally and drawn off by said drawing device.

* * * * *

UNITED STATES PATENT AND TRADEMARK OFFICE
CERTIFICATE OF CORRECTION

PATENT NO. : 7,475,567 B2 Page 1 of 1
APPLICATION NO. : 11/098142
DATED : January 13, 2009
INVENTOR(S) : Maenner et al.

It is certified that error appears in the above-identified patent and that said Letters Patent is hereby corrected as shown below:

Column 14, line 14 delete "or"

Signed and Sealed this

Second Day of June, 2009

JOHN DOLL
*Acting Director of the United States Patent and Trademark Office*